United States Patent [19] [11] 4,202,784
Cahill et al. [45] May 13, 1980

[54] TERTIARY CARBINAMINE MODIFIED MANNICH COMPOSITIONS AND LUBRICANTS CONTAINING SAME

[75] Inventors: Paul J. Cahill; John H. Udelhofen, both of Wheaton, Ill.

[73] Assignee: Standard Oil Company (Indiana), Chicago, Ill.

[21] Appl. No.: 28,566

[22] Filed: Apr. 9, 1979

[51] Int. Cl.$^2$ .............................................. C10M 1/32
[52] U.S. Cl. ............................ 252/51.5 R; 44/58; 252/51.5 A; 260/566 R; 260/570.5 P; 525/383; 525/384
[58] Field of Search ............ 252/51.5 A, 51.5 R; 44/58; 260/566 R, 570.5 P; 526/53, 58

[56] References Cited

U.S. PATENT DOCUMENTS

| | | | |
|---|---|---|---|
| 2,962,442 | 11/1960 | Andress, Jr. | 252/51.5 R |
| 2,962,531 | 11/1960 | Coffield | 252/51.5 R X |
| 3,036,003 | 5/1962 | Verdol | 252/51.5 R X |
| 3,346,496 | 10/1967 | Neumann et al. | 252/51.5 R X |
| 3,544,520 | 12/1970 | Culbertson et al. | 252/51.5 R X |
| 3,634,248 | 1/1972 | Andress, Jr. | 252/51.5 R X |
| 3,634,515 | 1/1972 | Piasek et al. | 252/51.5 R X |
| 3,872,019 | 3/1975 | Culbertson et al. | 252/51.5 R X |
| 3,948,619 | 4/1976 | Worrel | 44/58 |
| 3,994,698 | 11/1976 | Worrel | 44/58 |
| 4,117,011 | 9/1978 | Malec | 252/51.5 R X |

*Primary Examiner*—Andrew Metz
*Attorney, Agent, or Firm*—Mark DiPietro; William T. McClain; William H. Magidson

[57] ABSTRACT

Mannich additives formed from a tertiary carbinamine, a substantially hydrocarbon compound having at least one acidic or active hydrogen, a polyamine and a formaldehyde-yielding reagent.

8 Claims, No Drawings

TERTIARY CARBINAMINE MODIFIED MANNICH COMPOSITIONS AND LUBRICANTS CONTAINING SAME

This invention relates to Mannich additives adapted to high temperature lubrication. More particularly, this invention relates to tertiary carbinamine derivatives of Mannich additive compositions which provide improved lubricating properties at high temperature, for example, in two-cycle gasoline engines.

Considerable interest exists in additives that prevent wear and the formation of deposits in engines that operate at high temperatures (e.g.) two-cycle, rotary engines etc. Engines operating at high temperatures are commonly used in recreation and industry. The increasing use of these engines results in an increasing demand for improved high temperature lubricants.

The industry standard high temperature two-cycle engine additive is apparently the reaction product of about 3 moles of isostearic acid and one mole of a polyamine. This reaction product suffers from the disadvantage that it is prepared from isostearic acid, a product of the "dimer acid process." The increased demand for dimer acids and isostearic acid has caused a relatively short supply of the isostearic acid. Further, a need exists for products with increased ability to prevent wear and the formation of deposits in engines at high temperatures.

Mannich additives are commonly made by the condensation reaction of an amine, generally a polyamine, a formaldehyde-yielding reagent and a substantially hydrocarbon compound having at least one acidic or active hydrogen. Examples of the preparation of said Mannich products are found in U.S. Pat. Nos. 3,539,633; 3,697,574; 3,704,308 3,736,357 and 3,751,365 which are expressly incorporated by reference herein. Commonly the substantially hydrocarbon compound having at least one acidic or active hydrogen comprises an alkyl phenol or a polymer derived from ethylenically unsaturated monomers which is oxidized to introduce carbonyls and associated active or acidic alpha hydrogens. These oxidized polymers are disclosed in U.S. Pat. Nos. 3,872,019 and 4,011,380 which are expressly incorporated by reference herein. These conventional Mannich additive compositions are highly effective in reducing the formation of harmful deposits in four-cycle gasoline and diesel engines. However, lubricants containing conventional Mannich additives suffer the drawback that at high temperatures the anti-wear and anti-deposit properties of the lubricant are reduced. That Mannich additives have heretofore not been useful for two-cycle high temperature engine operation is unfortunate in view of the fact that Mannich additives are generally less expensive than polyamine derivatives of isostearic acid.

In four-cycle and diesel engines lubricants are contained in a sump and are circulated throughout the engine. Small amounts of the lubricant are unavoidably consumed in engine operation, but the bulk of lubricant continually recirculates both lubricating and cooling engine surfaces. Air-cooled two-cycle engines operate at about 95°–110° C. (175°–200° F.) higher than normal operation temperature of two-cycle water cooled two-cycle gasoline engines, four-cycle gasoline and diesel engines. Further, in two-cycle engines the lubricant is dissolved in the fuel which is atomized into a combustible air-fuel-lubricant mixture. The air-fuel-lubricant mixture moves throughout the engine contacting moving parts in the engine leaving a film of lubricant and additives to provide lubrication. The bulk of the air-fuel-lubricant mixture moves through the engine and is ultimately burned.

Stover, U.S. Pat. No. 4,025,316 discloses two-cycle lubricants comprising a major amount of a lubricant and a low molecular weight Mannich reaction product of a $C_8$–$C_{40}$ alkyl phenol, formaldehyde and an amine. In the presence of lubricants containing these low molecular weight Mannich products some harmful wear occurs and deposits form in gasoline engines.

Accordingly, a need exists for both a new synthetic additive providing engine cleanliness, anti-wear and other properties to lubricants, and new synthetic Mannich products providing high temperature engine cleanliness and anti-wear activity.

The general object of the invention is to improve lubricating properties of synthetic Mannich additives for high engine temperatures. A further object of the invention is to improve the ability of Mannich additives to prevent wear and deposits at high temperature. Still another object of the invention is to improve the ability of lubricants containing synthetic Mannich additives to prevent wear and deposits in two-cycle engine lubrication. Other objects appear hereinafter.

We have found that the objects of the invention can be attained by producing tertiary alkyl carbinamine (tertiary alkyl azomethine) derivatives of Mannich products. The high temperature activity of the tertiary carbinamine derived Mannich additives apparently results from the presence of tertiary alkyl groups linked to the Mannich product at various sites through an aminomethylene bridge.

Briefly the high temperature modified Mannich additive is made by the reaction of a tertiary alkyl primary carbinamine, a substantially hydrocarbon compound with at least one active or acidic hydrogen, formaldehyde, and a polyamine. Tertiary alkyl primary carbinamines are well known compounds, but to the best of our knowledge tertiary alkyl primary carbinamine derivatives of Mannich products have not been disclosed as lubricant additives.

The tertiary alkyl carbinamine can be formed from the tertiary alkyl amine and formaldehyde and then reacted with the Mannich compound or precursors. The tertiary carbinamine can also be formed simultaneously in the Mannich reaction mixture of active or acidic hydrogen compound, polyamine and formaldehyde provided a tertiary alkyl primary amine is present. Alternatively, the Mannich reaction product can be reacted with tertiary alkyl primary amine and a formaldehyde-yielding reagent.

Tertiary carbinamines useful in this invention have the general formula

$$R_t-N=CH_2$$

$R_t$ is a tertiary substantially aliphatic group having from 4 to 500 carbon atoms, for example, tertiary butyl, t-decyl, t-eicosyl, t-pentacontyl, etc. Preferably, for ease of reaction, high-yield and high-temperature stability R has 4 to 20 carbon atoms; for example t-butyl, t-pentyl, t-hexyl, t-heptyl, t-octyl, t-nonyl, t-decyl, t-dodecyl, t-tetradecyl, t-hexadecyl, t-octadecyl, t-eicosyl, etc. The characteristic important to the improvement appears to be the size or steric hindrance of the substantially aliphatic group.

Mannich additives suitable for reaction with tertiary alkyl carbinamine are made by the condensation of a polyamine, a formaldehyde-yielding agent, and a substantially hydrocarbon compound containing at least one active or acidic hydrogen; for example a para alkyl phenol. Generally, the presence of at least one acidic hydrogen or active hydrogen is necessary in the substantially hydrocarbon compound to provide a reaction site for the Mannich reaction. The examples of various hydrocarbon compounds useful for the preparation of Mannich additives are alkyl aromatic monohydroxy compounds such as para-mono-alkyl phenols, for example, para octyl phenol, para nonyl phenol, para decyl phenol and other para alkyl phenols made by the alkylation of phenol with olefinic polymers having molecular weights from about 600 to about 3,000, made from $C_2$ to $C_4$ olefinic monomers, for example, propene, 1-butene, 2-butene and isobutylene, etc. Other substantial hydrocarbon compounds useful in the Mannich reaction are alkyl naphthols, oxidized olefinic polymers such as ethylenepropylene, copolymers having a molecular weight from about 2,000 to about 10,000, and other aromatic compounds such as compounds discussed in the patents cited above. A ditertiary alkyl phenol, disclosed in Ser. No. 028,567, filed on Apr. 9, 1979 which is expressly incorporated by reference herein can be used in conjunction with the mono-alkyl phenol to increase the ability of the Mannich to prevent wear and deposits.

Polyamines useful for the production of the tertiary alkyl carbinamine modified Mannich compounds contain at least two nitrogen atoms at least one of which is hydrogen bonded. Polyamines of the formula $NH_2(A-NH-)_nH$ wherein A is an alkylene group having 2 to 6 carbon atoms and n is a number from 1 to 6 are preferred. Examples of the preferred polyamines for reasons of high activity and high performance of lubricant additives and low cost are ethylenediamine, diethylenetriamine, triethylenetetramine, tetraethylenepentamine, 1,6-hexane diamine, etc. Other polyamines useful for producing Mannich products are bis-(aminopropyl)-piperazine, bis(aminopropyl)-ethylene diamine, and bis(aminopropyl)propylene diamine.

Any conventional formaldehyde-yielding reagent is useful for the production of both the tertiary carbinamine and the modified Mannich products. Examples of such formaldehyde-yielding reagents are trioxane, formalin, paraformaldehyde, trioxymethylene, etc.

In somewhat greater detail the tertiary carbinamines can be prepared by the well-known condensation of about equimolar amounts of a tertiary alkyl primary amine and formaldehyde in the presence of a strong base if necessary. The proposed reaction is as follows:

$R_t-NH_2 + CH_2O \text{ [Base]} =$

$R_t-N=CH_2 + H_2O$

The formaldehyde is generally added to the amine at a rate that the temperature does not exceed the decomposition temperature of the tertiary carbinamine in the presence of an alkaline aqueous phase, about 50° C. About 0.1 to about 0.5 moles of a strong base such as potassium hydroxide per mole of amine can be added to aid in the elimination of water during the reaction between the amine and formaldehyde. Upon the addition of the base two phases can form, an aqueous phase and an organic phase. If an organic phase and an aqueous phase form, the organic phase is separated from the aqueous phase. In any case the reaction mixture or the organic phase is distilled to recover the tertiary carbinamine which boils under vacuum at 150°-170° C. (300°-340° F.). High molecular weight (greater than $C_8$) carbinamines can be made with an alternative preparation. Aqueous formalin (37.0 wt.%) is added slowly to about equimolar amounts of tertiary-alkyl amine at room temperature. Once addition is complete and the reactants are thoroughly mixed, the reactants are heated to 121° C. (250° F.) Nitrogen gas is blown through the reactants to remove water for 2 hours. At the end of the stripping the product is useable as is.

The tertiary carbinamine modified Mannich compounds can be prepared (1) by the reaction of a substantially hydrocarbon compound, formaldehyde, a polyamine and the tertiary alkyl primary carbinamine; (2) the reaction of a Mannich product and the tertiary alkyl primary carbinamine; or (3) the reaction of a tertiary amine and formaldehyde simultaneously with the formation of the Mannich product from a substantially hydrocarbon compound, formaldehyde and a polyamine.

The tertiary carbinamine modified Mannich compounds can be prepared by the reaction of the substantially hydrocarbon compound, the polyamine, formaldehyde-yielding reagent and the tertiary alkyl primary carbinamine. The substantially hydrocarbon compound is reacted with about 0.1 to 5.0 moles of polyamine, about 0.2 to 10.0 moles of formaldehyde-yielding compound, 0.1 to 10.0 moles of the tertiary alkyl primary carbinamine. The reaction can be performed at a temperature from about ambient (25° C.) to about 300° C. Preferably, for ease of reaction, low decomposition, and a short reaction time of one to three hours, the reaction is performed at 90° C.–150° C. Preferably, the reaction is conducted under a non-oxidizing atmosphere such as nitrogen or argon. At the end of the reaction the mixture is stripped of volatiles with an inert gas, is cooled and is ready for use.

The tertiary alkyl primary carbinamine Mannich can also be produced by the reaction of the tertiary carbinamine and a Mannich condensation product produced from a substantially hydrocarbon compound, about 0.1 to about 5 moles of a polyamine and 0.2 to about 10 moles of formaldehyde-yielding reagent per mole of the substantially hydrogen compound. The reaction is performed preferably under an inert gas at a temperature from about 60° to about 300° C. At the end of the reaction the mixture can be stripped with a heated inert gas stream to remove volatile components. A more detailed explanation of the preparation of Mannich condensation product is presented in each of the patents incorporated above. To the Mannich additive is added about 0.1 to about 10 moles of a tertiary alkyl carbinamine per mole of the substantially hydrocarbon compound. The mixture is again heated to a temperature from about 60° to about 300° C. for a period of time up to 24 hours. At the end of the reaction the mixture is stripped with a heated inert gas, is cooled and is ready for use.

The tertiary alkyl carbinamine can be generated from a tertiary alkyl primary amine and formaldehyde simultaneously, with and in the same reaction vessel during the condensation of the Mannich additive from the substantially hydrocarbon compound having at least one acidic or active hydrogen, formaldehyde and polyamine, in which the tertiary alkyl carbinamine reacts with the Mannich product or precursor molecules. In this instance the substantially hydrocarbon compound having at least one active or acidic hydrogen is reacted with 0.1 to 10 moles of a polyamine, 0.4 to about 20 moles of a formaldehyde-yielding reagent, and 0.1 to 10 moles of a tertiary alkyl primary amine per mole of hydrocarbon compound. The amount of formaldehyde present in the reaction mixture must be adequate to support both the reaction of formaldehyde-yielding reagent, the substantially hydrocarbon compound and the polyamine to form the Mannich additive and the reaction of formaldehyde with the tertiary alkyl primary amine to form the tertiary alkyl carbinamine. At least one mole of formaldehyde-yielding reagent must be present for each mole of combined tertiary alkyl primary amine and polyamine. The reaction mixture is agitated and heated to a temperature from about 60° to about 300° C. for a period of time up to 24 hours. At the end of the reaction, the mixture is stripped of volatile components by a heated inert gas stream, is cooled and is ready for use.

The reaction can be run in various inert aliphatic or aromatic organic solvent phases such as hexane, heptane, lingroin, benzene, toluene, distillate products such as kerosene or gasoline fractions, etc. Preferably the reaction is run in a lubricant oil solvent. At the conclusion of the reaction the reaction product can be directly blended into a lubricant or additive package.

The various sequences of addition of the reactant forming the high temperature Mannich additive with the tertiary alkyl carbinamine appear to be equivalent in the production of additives with high temperature lubricant activity. Apparently the various means of attaching the tertiary alkyl function to the Mannich product through the amino methylene group are equivalent means in increasing the high temperature lubricating activity of the product. We theorize that Mannich additives made with tertiary alkyl carbinamines can contain the tertiary alkyl derivatives in at least two locations in the Mannich additive. The tertiay alkyl carbinamine functional groups can derivatize Mannich additives at either the active hydrogen on the substantially hydrocarbon compound or by replacing a hydrogen bonded to a nitrogen atom in a polyamine function. Based on these assumptions, one proposed molecular formula, of many, for the Mannich additives made with the tertiary alkyl carbinamine is shown below:

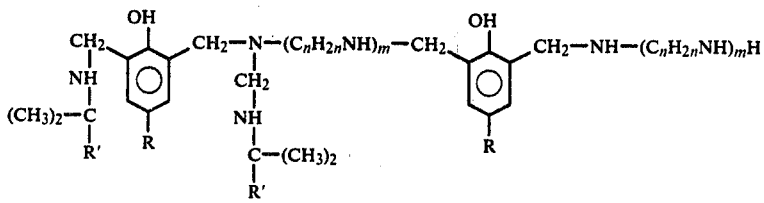

The formula shows a tertiary alkyl group attached to the Mannich composition at two locations, (A) the para position of the alkyl phenol function through an amino methylene group, and (B) a polyamine nitrogen atom through an amino methylene group in the Mannich additive made from an alkyl phenol, formaldehyde-yielding reagent and a polyamine. The tertiary alkyl primary carbinamine can be attached at any hydrogen bonded nitrogen or any carbon atom with an active hydrogen.

The compounds can be prepared in continuous or batch equipment. In batch mode an amount of each reactant is charged to a suitable reaction vessel and maintained and stirred at appropriate temperatures and pressures. The product is then placed in suitable strippers, filters and purification equipment. In continuous phase a stream of reactant or reactants is charged continuously to a vertical or horizontal reaction zone maintained at appropriate temperature, pressure and flow rate. The product stream can be continuously withdrawn from the other end into appropriate purification equipment.

The modified Mannich products disclosed herein can be used in lubricating oil at a concentration of about 1.0 to 50.0(wt)%; preferably 5 to 15(wt)% of the oil composition for highest performance at lowest cost. The lubricant containing the Mannich is dissolved in gasoline for use in two-cycle engines. About 1 part lubricant is used per 1 to 100 parts by weight gasoline. The two-cycle engines currently in use require 1 part lubricant per 35 to 60 parts gasoline depending on the engine.

Hydrocarbon oils useful for preparing the lubricants of this invention include generally solvent-refined, clean-burning petroleum oils having relatively low viscosity. Commonly about 5W to 30W oils can be used. Highly preferable oils have low viscosity, about 50 to 90 SUS at 210° F., a viscosity index of 50 to 90, and low Conradson carbon residue.

Any commercially available gasoline can be used, however some engines require leaded while others require unleaded.

In high temperature engine operation the Mannich additive made with the tertiary alkyl carbinamine can be used with a variety of other additives other than the hindered phenol compounds. One useful co-additive is the reaction product of an alkyl succinic anhydride and a polyamine used as an anti-rust agent. The alkyl succinic anhydride can have a molecular weight from about 300 to about 6,000, and various polyamines as discussed above can be used. From about 0.001 parts to about 1 part of this product can be used with 1 part of the Mannich additive made with the tertiary alkyl primary amine. Various other additives can be beneficially used and are well known for activity in high temperature engine operation.

Two-cycle additives are evaluated and compared with the industry standard additive Oronite 340K, in the standard YAMAHA test and in the hot tube test. In the YAMAHA TEST, the additives are dissolved or suspended in oil and the oil is dissolved in gasoline. The standard engine used in the evaluation in a Yamaha RD-350B air-cooled, two-cylinder, two-cycle engine. The separate cylinder arrangement of this engine along with separate carburetion and ignition allow reference additive to be run along with the candidate additive or two candidate additives simultaneously in the evaluation. The engine is mounted on a test stand and coupled to a dynamometer with necessary additional equipment so that test parameters are easily controlled and monitored. Prior to testing, the engine is completely disassembled and all pertinent measurements are taken. The test engine is operated at about 6,000 rpm at half throttle and consumes from about 30 to about 33 grams of fuel per minute. The spark plug temperature is maintained at about 160°–190° C. (370° to about 375° F.) and the exhaust temperature is 600° to 650° C. (1,100° to 1,200° F.). The engine is idled at operating speed for a 5-minute warmup and then brought up to 6,000 rpm for 25 minutes. Thereafter the test is run under the following cyclic conditions. In the first 5 minutes the engine is warmed and idled. The next 25 minutes the engine is run at 6,000 rpm in fifth gear. The next 5 minutes the engine is idled in neutral and the warmup, fifth gear and idle cycle is repeated five times for a total of 150 minutes. The engine is then shut down and heat from the cylinder head is permitted to soak through the engine for at least 1 hour. This cycle is continued 8 times for a total of 20 hours. At the conclusion of the 20 hour test period, the engine is completely disassembled and the performance of the additive is judged by visual examination of the engine for deposits and by measuring specific engine parts for wear.

EXAMPLE I

The tertiary carbinamine was prepared by charging 258 gms (2 moles) of a tertiary octyl amine (2 moles) into a two-liter flask equipped with a stirrer and thermometer. 168 grams of 38 percent aqueous formalin (2.06 moles) was added dropwise over a 5-minute period and the temperature was maintained to about 25° C. The mixture was stirred for 5 minutes and 10 grams of potassium hydroxide was added to the mixture. The mixture was stirred until potassium hydroxide was fully dissolved and two phases separated. The mixture was poured into a separatory funnel and the aqueous phase was discarded. The organic phase was dried over potassium hydroxide and was distilled. The final product was recovered by the distillation organic phase between 151° C. (304° F.) and 155° C. (312° F.).

To a three-liter three-necked flask equipped with a reflux condenser, thermostat, and thermometer and a nitrogen atmosphere was charged 1,169.5 grams (0.78 moles) of 60 percent active polybutyl phenol in polybutene, molecular weight about 905, 114.2 grams of 5W oil and 23.4 grams (0.39 moles) of ethylenediamine. The contents of the flask were mixed well, heated to about 95° C., and 63.3 grams (0.78 moles) of 37 percent aqueous formalin were added to the flask over a 30-minute period. The temperature was maintained during this period and for another 30 minutes after the addition was complete. The mixture was heated to 155° C. and volatiles including water were stripped with a nitrogen stream for 2 hours. To this mixture were added dropwise over a 30-minute period 55 grams of the tertiary carbinamine prepared above. The temperature was maintained at 121° C. for two hours.

EXAMPLE II

The tertiary carbinamine was prepared by charging to a one-liter flask equipped with a stirrer and thermometer, 200 grams (1 mole) of Primene 81-R which is a mixture of $C_{12-14}$ tertiary alkyl primary amines. To the amine was added 106.1 grams (1.3 moles) of 37 percent formalin dropwise with stirring at such a rate that the temperature of the reaction does not exceed 40° C. To the cooled mixture was added 8 grams of powdered potassium hydroxide. When the base was completely dissolved, an aqueous and an organic layer formed. The reaction mixture was poured into a separatory funnel and the aqueous layer was discarded. The organic layer was dried over potassium hydroxide and distilled. The product tertiary alkyl carbinamine distilled between 153° C. (308° F.) and 170° C. (340° F.).

To a three-neck round bottom flask equipped with a stirrer, thermostat, thermometer and dropping funnel was charged 1,822 grams (1.22 moles) of polybutyl phenol, molecular weight 905 (60(wt)% active in polybutene), 178 grams of 5W oil and 36.5 (0.61 moles) grams of ethylene diamine. Then the contents of the flask were thoroughly mixed and heated to a temperature about 95° C. To the mixture in the flask was added 98.6 grams (1.2 moles) of 37 percent aqueous formalin over a 30-minute period while the temperature was maintained between 90° and 95° C. The contents of the flask were then heated to 155° C. and water was stripped with nitrogen for 2 hours. To this mixture at 155° C. was added 123.4 grams (0.61 moles) of the tertiary carbinamine prepared above. The temperature was maintained at 160° C. for 2 hours.

EXAMPLE III

A tertiary alkyl primary carbinamine was prepared as follows. Six hundred thirty grams (2 moles) of Primene JM-T, a mixture of about $C_{20}$ tertiary alkyl primary amines, was charged into a two-liter flask equipped with a stirrer and thermometer. 168 grams of 37 percent aqueous formalin (2.07 moles) was added dropwise over a 30-minute period and the temperature was maintained to about 30° C. The mixture was stirred for 30 minutes and 20 grams of potassium hydroxide was added to the mixture. The mixture was stirred until the potassium hydroxide was fully dissolved and two phases separated. The mixture was poured into a separatory funnel and the aqueous phase was discarded. The organic phase was dried over potassium hydroxide and was vacuum distilled. The final product was recovered by the distillation of the organic phase between 66° C. and 150° C. at 0.2 mm/Hg. The tertiary carbinamine modified Mannich was prepared as follows. To a three-liter, three-necked flask equipped with a reflux condenser, thermostat, and thermometer was charged 1,875 grams (1.14 moles) of 60 percent active polybutyl phenol in oil, molecular weight about 1,000, 190 grams of 5W oil and 34.3 grams (0.57 moles) of ethylenediamine. The contents of the flask were mixed well, heated to about 85° C., and 92.5 grams (1.14 moles) of 37 percent aqueous formalin were added to the flask over a 60-minute period. The temperature was maintained during this period and for another 30 minutes after the addition was complete. The mixture was heated to 150° C. and volatiles including water were stripped with a nitrogen stream for 4 hours. To this mixture were added dropwise over a 60-minute period 186.5 grams of tertiary carbinamine prepared above. The flask was stirred and maintained at 150° C. and stripped of volatiles with a heated nitrogen for 1 hour. The mixture was cooled and was ready for use. Nitrogen content of the product was 1.04%.

A comparison of the Yamaha engine test results on both the standard ORONITE-340K Additive and the tertiary alkyl carbinamine Mannich of Example III is tabulated in Tables I, II, and II.

EXAMPLE IV

The product of Example III was also prepared in the following way. To a five-liter 3-neck round bottom flask equipped with a stirrer, thermostat, thermometer and dropping funnel was charged 2,000 grams (1.47 moles) of a polybutene substituted phenol, molecular weight about 900, 200 grams of 5W oil, and 44.2 grams (0.74 mole) ethylene diamine. The contents of the flask were thoroughly mixed and heated to about 98° C. (210° F.) To the mixture was added 119.6 grams (1.47 moles) of 37% aqueous formalin over a period of 30 minutes while the flask was maintained at 98° C. (210° F.). The flask was then heated to 155° C. (300° F.) and water of reaction and other volatiles were stripped with a nitrogen stream for 1 hour. After reducing the nitrogen stream to a slow bleed, 232 grams (0.74 mole), of Primene JM-T was added in one portion, and then 59.8 grams (0.74 mole) of 37% aqueous formalin, dropwise over 15 minutes. The mixture was stirred at 155° C. (300° F.) for one hour. The nitrogen stream was then increased to strip the mixture of water of reaction and volatiles for 2 hours at 155° C. (300° F.). The mixture was cooled and was ready for use.

A comparison of the Yamaha engine test results on both the standard ORONITE-340K Additive and the tertiary alkyl carbinamine Mannich of Example III is tabulated in Tables I and II.

TABLE I

YAMAHA ENGINE TESTS (7) ORONITE-340K STANDARD

| Rated Item (10 = Max.) | Overall Ave. | Cyl #1 Ave. | Cyl #2 Ave. |
|---|---|---|---|
| Piston Skirt | 8.8 | 9.2 | 8.2 |
| Ring Land | 6.4 | 7.2 | 5.1 |
| Undercrown | 5.4 | 6.6 | 3.3 |
| Top Ring | 10.0 | 10.0 | 10.0 |
| 2nd Ring | 8.9 | 9.6 | 7.7 |
| Exhaust Port | 9.8 | 9.8 | 9.8 |
| Head Deposits | 9.2 | 9.2 | 9.1 |
| Piston Top | 9.1 | 9.1 | 9.0 |
| Piston Scuff | 10.0 | 10.0 | 10.0 |
| Top Groove | 3.7 | 1.9 | 6.6 |
| 2nd Groove | 4.8 | 7.7 | 0 |
| Average | 7.8 | 8.2 | 7.2 |

NOTE:
OR-340K was tested at 10% in oil, and the oil at 1:50 in Indolene in all tests.

TABLE II

YAMAHA ENGINE TESTS (5) TERTIARY CARBINAMINE MODIFIED MANNICH OF EXAMPLE III

| Rated Item | Overall Ave. | Cyl #1 Ave. | Cyl #2 Ave. |
|---|---|---|---|
| Piston Skirt | 8.6 | 8.4 | 8.7 |
| Ring Land | 6.4 | 6.1 | 6.6 |
| Undercrown | 5.2 | 5.2 | 5.2 |
| Top Ring | 10.0 | 10.0 | 10.0 |
| 2nd Ring | 9.7 | 9.8 | 9.6 |
| Exhaust Port | 9.8 | 9.8 | 9.8 |
| Head Deposits | 9.2 | 9.2 | 9.2 |
| Piston Top | 9.1 | 9.2 | 9.1 |
| Piston Scuff | 10.0 | 10.0 | 10.0 |
| Top Groove | 1.1 | 1.0 | 1.1 |
| 2nd Groove | 8.0 | 7.7 | 8.2 |
| Average | 7.9 | 7.9 | 8.0 |

An examination of Tables I and II shows that the tertiary carbinamine modified Mannich is essentially equivalent to the ORONITE-340K in terms of deposit prevention in the YAMAHA TEST. An examination of Table III shows the superiority of the modified Mannich additive to the standard and a significant increase in the prevention of piston varnish and ring sticking in the tertiary carbinamine modified Mannich blended with a small amount of di-t-butyl-p-dodecyl-phenol compound. The numbers displayed in Tables I, II, and III are approximately logarithmic, thus the average piston varnish of the piston in the engine fueled with the ORONITE-340K has about 100 times the varnish of the piston in the engine fueled with the blend of modified Mannich and inhibitor.

In the hot tube test, a test oil formulation and heated $NO_X$ are passed upward through a 2 mm capillary tube heated in an aluminum block. The test oil is consumed in the test, and the detergent property of the additive in the formulation is rated by the tendency to leave dark colored deposits on the tube.

TABLE III

YAMAHA TEST BLEND OF di-t-butyl-p-dodecyl-phenol and TERTIARY CARBINAMINE MODIFIED MANNICH

| Rated Item (10 = Max) | Formulation* With Product of EXAMPLE I | Formulation** With ORONITE-340K |
|---|---|---|
| Piston Varnish (Ave.) | 8.0 | 5.9 |
| Ring Lands | 3.6 | 1.2 |
| Undercrown | 2.1 | 1.0 |
| Ring Sticking | | |
| #1 | 9.5 | 10.0 |
| #2 | 9.0 | 5.0 |
| Exhaust Port Blockage | 9.8 | 9.8 |
| Piston Top Deposit | 9.0 | 9.4 |
| Scuffing | 10.0 | 10.0 |

*Formulation
PROD OF EX IV and 10.8 (wt)%
di-t-butyl-p-dodecyl-phenol 2.6 (wt)%
Cities Service 650 Neutral 58 (wt)%
Cities Service 150 B.S. 9 (wt)%
AMOSOL (SOLVENT) 20 (wt)%
**ORONITE 340K @10 (wt)%

TABLE IV

HOT TUBE TEST BLEND OF di-t-butyl-p-dodecyl-phenol and TERTIARY CARBINAMINE MODIFIED MANNICH

| Additive*** Prod. | di-t-butyl-p-dodecyl phenol conc. (wt)% | HOT TUBE 425° F. ($NO_2$) (10 = max.) | 495° F. ($NO_2$) |
|---|---|---|---|
| Example IV | 0.0 | 5 | 2 |
| Example IV | 1.0 | 8 | 2.5 |
| Example IV | 2.0 | 9 | 3 |
| Example IV | 3.0 | 9 | 2.5 |
| ORONITE-340K | 0.0 | 9 | 2 |
| Conventional Mannich | 0.0 | 2 | 1.5 |

***Test Formulation
Additive 10 (wt)%
di-t-butyl-p-dodecyl-phenol and
Cities Service 650 N 60 (wt)%
Cities Service 150 B.S. 10 (wt)%
Stoddard Solvent 20 (wt)%

An examination of Table IV shows the improvement in the hot tube test performance of the modified Mannich due to the "hindered" phenol in the 425° C. and 495° C. $NO_2$ hot tube test.

Since many embodiments of this invention may be made and many changes may be made in the embodiments described, the foregoing is to be interpreted as illustration only and our invention is defined by the claims hereinafter appended.

We claim:

1. A Mannich composition comprising the reaction product of a substantially hydrocarbon compound having at least one acidic or active hydrogen selected from the group consisting of alkyl phenols, alkyl naphthols and oxidized olefin polymers, formaldehyde or a formaldehyde-yielding compound, a polyamine and a tertiary alkyl carbinamine.

2. The composition of claim 1 wherein the tertiary alkyl carbinamine has the formula $$R_t\text{—}N\text{=}CH_2$$

wherein each $R_t$ comprises a tertiary alkyl group having 4 to 500 carbon atoms.

3. The composition of claim 2 wherein each $R_t$ comprises a tertiary alkyl group having 4 to 20 carbon atoms.

4. The composition of claim 1 wherein the substantially hydrocarbon compound having at least one acidic or active hydrogen comprises an alkyl phenol having a molecular weight from about 200 to about 6,000.

5. A composition comprising the reaction product of an alkyl phenol, 0.1 to 10 moles of a polyamine per mole of phenol, 0.1 to 10 moles of formaldehyde or a formaldehyde-yielding reagent per mole of phenol, and 0.1 to 10 moles of a tertiary alkyl carbinamine per mole of the phenol at a temperature of about 60° C. to about 300° C.

6. A lubricant composition containing a major portion of a lubricating oil and an effective amount of from 1.0 to 50.0 weight percent of composition of claim 1 or claim 5.

7. The composition of claim 1 wherein the tertiary alkyl carbinamine is formed from a tertiary alkyl primary amine and formaldehyde or a formaldehyde-yielding reagent during the reaction of the substantially hydrocarbon compound having at least one acidic or active hydrogen, a polyamine and formaldehyde or a formaldehyde-yielding reagent.

8. The composition of claim 1 wherein the tertiary alkyl carbinamine reacts with a Mannich reaction product of formaldehyde or a formaldehyde-yielding reagent, a polyamine, and a substantially hydrocarbon compound having at least one active or acidic hydrogen.

* * * * *